(12) United States Patent
Chen et al.

(10) Patent No.: US 11,709,770 B2
(45) Date of Patent: Jul. 25, 2023

(54) SYSTEM AND METHOD FOR IMPLEMENTING A ONE TO MANY CONFIGURATION MANAGEMENT TOOL

(71) Applicant: JPMorgan Chase Bank, N.A., New York, NY (US)

(72) Inventors: Fei Chen, London (GB); Pathik Paul, Edison, NJ (US); Indrasan Singh, Plainsboro, NJ (US); Ebhdulla Shaik, Bangalore (IN); Brendan Connelly, Somersworth, NH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/230,472

(22) Filed: Apr. 14, 2021

(65) Prior Publication Data

US 2021/0318950 A1    Oct. 14, 2021

Related U.S. Application Data

(60) Provisional application No. 63/029,922, filed on May 26, 2020.

(30) Foreign Application Priority Data

Apr. 14, 2020  (IN) ............................. 202011016151

(51) Int. Cl.
*G06F 11/36* (2006.01)
*G06F 9/445* (2018.01)

(52) U.S. Cl.
CPC ...... *G06F 11/3696* (2013.01); *G06F 9/44505* (2013.01); *G06F 11/3664* (2013.01)

(58) Field of Classification Search
CPC ............. G06F 9/44505; G06F 11/3696; G06F 11/3664
See application file for complete search history.

(56) References Cited

U.S. PATENT DOCUMENTS

| | | | |
|---|---|---|---|
| 7,827,548 B1 * | 11/2010 | Anderson ................. | G06F 8/63 717/174 |
| 2010/0161629 A1 * | 6/2010 | Palanisamy ........... | G06F 16/972 707/769 |
| 2015/0067642 A1 * | 3/2015 | Chen ........................ | G06F 8/71 717/121 |
| 2018/0322032 A1 * | 11/2018 | Thazhathekalam ......................... | G06F 9/44505 |
| 2019/0324767 A1 * | 10/2019 | Stein ................... | G06F 9/44505 |

OTHER PUBLICATIONS

Piipari, Tapio. Dynamic configuration management. MS thesis. 2013. (Year: 2013).*

* cited by examiner

*Primary Examiner* — Craig C Dorais
*Assistant Examiner* — Joanne G Macasiano
(74) *Attorney, Agent, or Firm* — Greenblum & Bernstein, P.L.C.

(57) ABSTRACT

The invention relates generally to a system and method for implementing a one to many configuration management tool using runtime injection to replace hard coded values. An embodiment of the present invention is directed to addressing configuration management challenges, enhancing software quality and improving operation performance.

17 Claims, 6 Drawing Sheets

| | | | | | | | |
|---|---|---|---|---|---|---|---|
| abc30u6611 | CC20 | UX | MIDDLEEND0 httpa://abc30u6611:7003 | mit-common-u1 | instance0 | mit | dp_mit | ux-dashboard | u1-services |
| abc30u6620 | CC20 | UX | MIDDLEEND0 httpa://abc30u6620:7003 | mit-common-u1 | instance1 | mit | mit1 | dp_mit | ux-dashboard | u1-services |
| abc30u6610 | CC20 | UX | MIDDLEEND0 httpa://abc30u6610:7003 | pte-common-u1 | instance0 | pte | pte | dp_pte | ux-dashboard | u1-services |
| abc30u6619 | CC20 | UX | MIDDLEEND0 httpa://abc30u6619:7003 | pte-common-u1 | instance1 | pte | pte | dp_pte | ux-dashboard | u1-services |
| abc30u6626 | CC20 | UX | MIDDLEEND0 httpa://abc30u6626:7003 | uat-common-u1 | instance0 | uat | uat1 | dp_uat | ux-dashboard | u1-services |
| abc30u6630 | CC20 | UX | MIDDLEEND0 httpa://abc30u6630:7003 | uat-common-u1 | instance1 | uat | uat1 | dp_uat | ux-dashboard | u1-services |
| abc30u6638 | CC20 | UX | MIDDLEEND0 httpa://abc30u6638:7003 | qs-common-u1 | instance0 | qa | qa | dp_qa | ux-dashboard | u1-services |
| abc30u6614 | CC20 | UX | MIDDLEEND0 httpa://abc30u6614:7003 | qs-common-u1 | instance1 | qa | qa | dp_qa | ux-dashboard | u1-services |

```
MY_DIRNAME=*`DIRNAME $0`*
ABS_DIRNAME=*`od ${MY_DIRNAME}:pwt`*
ABS_PARENTDIR=*`od t{MY_DIRNAME} xxx ../pwt`*
CurrentTime=*`date +\Y\m\d\x\x\s`*
CurPgm=*`basename $0`*
CurHostname=*`hostname`       310
FullHostname=*`mnlookup ${CurHostname}  |  qrep Name   |   awk '{print $2}'`*
if [ [ *${CurPgm}* = *DDDeploy.kam* ]] ; then
    DetailLogFile=$1ABS_PARENIDIS}/logs/${CurMostName}/${CurPgm}.${TargetEnvironment}.${ReleaseNo}.${CurrentTime}.log
else
    DetailLogFile=$1ABS_PARENIDIS}/logs/${CurMostName}/"basename $0".${CurrentTime}.tmp.log
    MvnCmdTempFile=${ABS_PARENTDIA}/logs/${CurMostname}/"basename $0".${CurrentTime}.mvn.tmp.log
fi DetailLogFile=t{ABS_PARENTDIR}/logs/${CurMostname} /"basename $0".${CurrentTime}.tmp.log
WEB_WAR_DIR=*${ABS_PARENTDIR}/jars_wars/${CutMostname}*
DBA_TAR_DIR=*${ABS_PARENTDIR}/tars*
EXTRACT_ROOT=*${ABS_PARENTDIR}/extract*
CONF_DIR=*${ABS_PARENTDIR}/conf*
Myldis='id *nu'
mkdir -p ${ABS_PARENTDIR}/logs/${CurMostname}          2>/dev/null
mkdir -p ${ABS_PARENTDIR}/jets_wars/${CurMostname}     2>/dev/null
FastHomeListFile=${ABS_DIRNAME}/CC20AppServers.txt                312
alias integer='typeset -1 "
integer MoOfcLines
CUR_ENV=*${1}*
FAST_ID=${2}*
if [[ *${CUR_ENV}* = ** ]] f then
    echo *NameOf_Current_Environment is mandatory 1st Parameter -- Please Provide the Environment Name*
    exit 101;
fi
if [[ *${FAST_ID}* = ** ]] f then
    echo *NameOf_Fast_Instance is mandatory 2nd Parameter -- Please Provide the Name of the Fast Instance*
    exit 202;
fi
searchString=*${CurMostname} [[ : space : ]] *$ {CUR_ENV} [[ : space : ]] *$ {FAST_ID} [[ : space : ]] *
```

Figure 3

```
searchString="'${CurHostname}[[:space:]]*${CUR_ENV} [[:SPACE:]]*${FAST_ID}[[:space:]]"

NoOfFcLines=`grep "^${searchString}" ${FastHomeListFile} | wc -1`                    410 if [[ ${NoOfFcLines} -gt 0 ]] ; then
    FC_LOCATION=`grep "^${searchString}" ${FastHomeListFile} |sort | uniq | awk '{print $6}'`
else
    echo "Env=\"${1}\" Host=\"${CurHostname}\" Fast=\"${FAST_ID}\" is not a valid combination ..please check ConfFile=\"${FastHomeListFile}\" .. Expecting=\"1\" Found=\"${NoOfFcLines}\" " exit 1;
fi
#echo "FC_LOCATION=\"${FC_LOCATION}\""
#CUR_ENV="${1}"
NoOfFcLines=`grep "^${searchString}" ${FastHomeListFile} | awk '{print $5}' | sort | uniq | wc -1`
    if [[ ${NoOfFcLines} -ne 1 ]] ; then myErrorExit "Param 5 not correct Env=\"${1}\" Host=\"${CurHostname}\" Fast=\"${FAST_ID}\" ConfFile=\"${FastHomeListFile}\" Expecting=\"1\" Found=\"${NoOfFcLines}\" " ;
    ex
    it 1; fi
NoOfFcLines=`grep "^${searchString}" ${FastHomeListFile} | awk '{print $6}' | sort | uniq | wc -1`
    if [[ ${NoOfFcLines} -ne 1 ]] ; then myErrorExit "Param 6 not correct Env=\"${1}\" Host=\"${CurHostname}\" Fast=\"${FAST_ID}\" ConfFile=\"${FastHomeListFile}\" Expecting=\"1\" Found=\"${NoOfFcLines}\" " ;
    ex
    it 1; fi
NoOfFcLines=`grep "^${searchString}" ${FastHomeListFile} | awk '{print $7}' | sort | uniq | wc -1`
    if [[ ${NoOfFcLines} -ne 1 ]] ; then myErrorExit "Param 7 not correct Env=\"${1}\" Host=\"${CurHostname}\" Fast=\"${FAST_ID}\" ConfFile=\"${FastHomeListFile}\" Expecting=\"1\" Found=\"${NoOfFcLines}\" " ;
    ex
    it 1; fi
NoOfFcLines=`grep "^${searchString}" ${FastHomeListFile} | awk '{print $8}' | sort | uniq | wc -1`
    if [[ ${NoOfFcLines} -ne 1 ]] ; then myErrorExit "Param 8 not correct Env=\"${1}\" Host=\"${CurHostname}\" Fast=\"${FAST_ID}\" ConfFile=\"${FastHomeListFile}\" Expecting=\"1\" Found=\"${NoOfFcLines}\" " ;
    ex
    it 1; fi
NoOfFcLines=`grep "^${searchString}" ${FastHomeListFile} | awk '{print $9}' | sort | uniq | wc -1`
    if [[ ${NoOfFcLines} -ne 1 ]] ; then myErrorExit "Param 9 not correct Env=\"${9}\" Host=\"${CurHostname}\" Fast=\"${FAST_ID}\" ConfFile=\"${FastHomeListFile}\" Expecting=\"1\" Found=\"${NoOfFcLines}\" " ;
    ex
    xit 1; fi
NoOfFcLines=`grep "^${searchString}" ${FastHomeListFile} | awk '{print $10}' | sort | uniq | wc -1`
    if [[ ${NoOfFcLines} -ne 1 ]] ; then myErrorExit "Param 10 not correct Env=\"${10}\" Host=\"${CurHostname}\" Fast=\"${FAST_ID}\" ConfFile=\"${FastHomeListFile}\" Expecting=\"1\" Found=\"${NoOfFcLines}\" " ;
    e
    it 1; fi
NoOfFcLines=`grep "^${searchString}" ${FastHomeListFile} | awk '{print $11}' | sort | uniq | wc -1`
    if [[ ${NoOfFcLines} -ne 1 ]] ; then myErrorExit "Param 11 not correct Env=\"${1}\" Host=\"${CurHostname}\" Fast=\"${FAST_ID}\" ConfFile=\"${FastHomeListFile}\" Expecting=\"1\" Found=\"${NoOfFcLines}\" " ;
    e
    it 1; fi
NoOfFcLines=`grep "^${searchString}" ${FastHomeListFile} | awk '{print $12}' | sort | uniq | wc -1`
    if [[ ${NoOfFcLines} -ne 1 ]] ; then myErrorExit "Param 12 not correct Env=\"${1}\" Host=\"${CurHostname}\" Fast=\"${FAST_ID}\" ConfFile=\"${FastHomeListFile}\" Expecting=\"1\" Found=\"${NoOfFcLines}\" " ;
    ex
    it 1; fi UtilInfo='                    grep "^${searchString}" ${FastHomeListFile} | awk '{print $5}'      |sort | uniq`
WebGceEaAppParamsDir='        grep "^${searchString}" ${FastHomeListFile} | awk '{print $7}'      |sort | uniq`
ListLoc='                     grep "^${searchString}" ${FastHomeListFile} | awk '{print $8}'      |sort | uniq`
EnvDefn='                     grep "^${searchString}" ${FastHomeListFile} | awk '{print $9}'      |sort | uniq`      412
webQuartzLocalityDir='        grep "^${searchString}" ${FastHomeListFile} | awk '{print $10}'     |sort | uniq`
WebEhcacheDir='               grep "^${searchString}" ${FastHomeListFile} | awk '{print $11}'     |sort | uniq`
WebWarLocation='              grep "^${searchString}" ${FastHomeListFile} | awk '{print $12}'     |sort | uniq`
shift
shift
```

Figure 4

```
echo " nxxxp /local/web/TomcatX/java/bin/java -XmsxxxxM -XmxxxxM -Dserver.port=8xx8 -Dendpoints.enabled=false -Dendpoints.info.enabled=true -
Dendpoints.health.enabled=true -verbose:gc -XX:+PrintGC -XX:-PrintGCApplicationStoppedTime -XX:+PrintGCApplicationConcurrentTime -XX:+PrintGCDateStamps -XX:+PrintGCDetails -
XX:+PrintGCTimeStamps -XX:+PrintTenuringDistribution -XX:+UseGCLogFileRotation -XX:GCLogFileSize=50M -XX:NumberOfGCLogFiles=20 -Xlogg
c:${currentDir}/logs/gc-%t.log -Dserver.ssl.enabled=true -Dserver.ssl.key-store=/apps/tdp/ux/cert/a_cc20tomcat.jks -Dserver.ssl.key-store-password=" NC(            )' -
Dserver.ssl.keyStoreType=JKS -Dserver.ssl.key
Alias= .       ----- -DdpEnv=${ListLoc} -DrestEnv=${WebQuartzLocalityDir} -Dserver.contextPath=/${CompName} -jar /aim/gfs/quad/uxe/collateral-central/${EnvDefn}/common/
${WebWarLocation}.war & "
nohup /local/web/TomcatX/java/bin/java -XmsxxxxM -XmxxxxM -Dserver.port=8xx8 -Dendpoints.enabled=false -Dendpoints.info.enabled=true -Dendpoints.health.enabled=true -
verbose:gc -XX:+PrintGC -XX:-PrintGCApplicationStoppedT
ime -XX:+PrintGCApplicationConcurrentTime -XX:+PrintGCDateStamps -XX:+PrintGCDetails -XX:+PrintGCTimeStamps -XX:+PrintTenuringDistribution -XX:+UseGCLogFileRotation -
XX:GCLogFileSize=xxM -XX:NumberOfGCLogFiles=xx -Xloggc:\
${currentDir}/logs/gxxxx.log -Dserver.ssl.enabled=true -Dserver.ssl.key-store=/apps/tdp/ux/cert/a_cc20txxxxt.jks -Dserver.ssl.            'ENC(               )' -
Dserver.ssl.keyStoreType=JKS -Dserver.ssl.keyAlias=
       ) -DdpEnv=${ListLoc} -DrestEnv=${WebQuartzLocalityDir} -Dserver.contextPath=/${CompName} -jar /aim/gfs/quad/uxe/collateral-central/${EnvDefn}/common/
${WebWarLocation}.war &
fi
```

SYSTEM AND METHOD FOR IMPLEMENTING A ONE TO MANY CONFIGURATION MANAGEMENT TOOL

CROSS REFERENCE TO RELATED APPLICATIONS

The application claims priority to Indian Patent Application No. 202011016151, filed Apr. 14, 2020, and U.S. Provisional Application 63/029,922, filed May 26, 2020, the contents of which are incorporated herein by reference in their entirety.

FIELD OF THE INVENTION

The invention relates generally to a system and method for implementing a one to many configuration management tool using runtime injection to replace hard coded values.

BACKGROUND OF THE INVENTION

When building and deploying software in multiple environments (e.g., development, testing, user acceptance, production, etc.), configuration management is critical to making the software live and ensuring smooth and successful execution. This generally requires multiple dimensions of key value parameter pairs which bring challenges to the whole software development lifecycle. Multiple environments, servers and targets are involved during software development which can lead to complexity in configuration management. Currently, development and operation teams spend huge amounts of time and resources on application configuration management and maintenance.

For example, in start-up and enterprise software development environments, software configuration management often involves maintaining multiple separate files for separate environments in multiple locations and multiple key value pair containers to generate configuration files when using common templates.

Common problems are recognized as heavy manual work of maintenance for developers to add, update, track key value pairs; management of multiple files in multiple locations (as a result, some values and/or files miss updates), vulnerability to human error with lack of single view (e.g., value "dev" is used in place of "qa") and operation bottleneck to agile software development and delivery because new changes require time consuming updates in multiple places and files.

These and other drawbacks exist.

SUMMARY OF THE INVENTION

According to one embodiment, the invention relates to a system that implements a one to many configuration management tool using runtime injection to replace hard coded values. The system comprises: a memory component that stores configuration files; an interactive user interface, coupled to the memory component, configured to receive user input; and a computer processor, coupled to the memory component and the interactive user interface, and further programmed to perform the steps of: defining environment configuration values in a single configuration file using a universal unique identifier; applying one or more variables as placeholders for one or more corresponding key values; using the universal unique identifier, mapping the one or more corresponding key values; and at runtime, dynamically injecting the one or more corresponding key values.

According to another embodiment, the invention relates to method that implements a configuration management tool that uses runtime injection to replace hard coded values. The method comprises the steps of: defining environment configuration values in a single configuration file using a universal unique identifier; applying one or more variables as placeholders for one or more corresponding key values; using the universal unique identifier, mapping the one or more corresponding key values; and at runtime, dynamically injecting the one or more corresponding key values.

An embodiment of the present invention is directed to specially programmed computer system comprising one or more computer processors, interactive interfaces, electronic storage devices, and networks. The computer implemented system and method described herein provide unique advantages to entities, users and other participants, according to various embodiments of the invention. An embodiment of the present invention is directed to implementing a one to many configuration management tool using runtime injection to replace hard coded values. With the configuration management tool of an embodiment of the present invention, various benefits may be realized including management of one file in single place, simplified ability to add, update and/or maintain values, reduced development efforts, efficient use of resources, etc. The configuration management tool provides a single view that is easy to compare, validate, reduce manual work and further promote one code base for multiple environments. An embodiment of the present invention is directed to facilitating operability, reducing configuration complexity in the source code and enhancing configuration management, software delivery and operations. The configuration management tool enables the ability to treat configuration management as code and promote code strong control in a software development life cycle (SDLC) process.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the present invention.

FIG. 2 is an exemplary interactive user interface, according to an embodiment of the present invention.

FIG. 3 is an exemplary interactive user interface, according to an embodiment of the present invention.

FIG. 4 is an exemplary interactive user interface, according to an embodiment of the present invention.

FIG. 5 is an exemplary interactive user interface, according to an embodiment of the present invention.

FIG. 6 is an exemplary interactive user interface, according to an embodiment of the present invention.

DETAILED DESCRIPTION OF THE PREFERRED EMBODIMENT(S)

Figure 1:
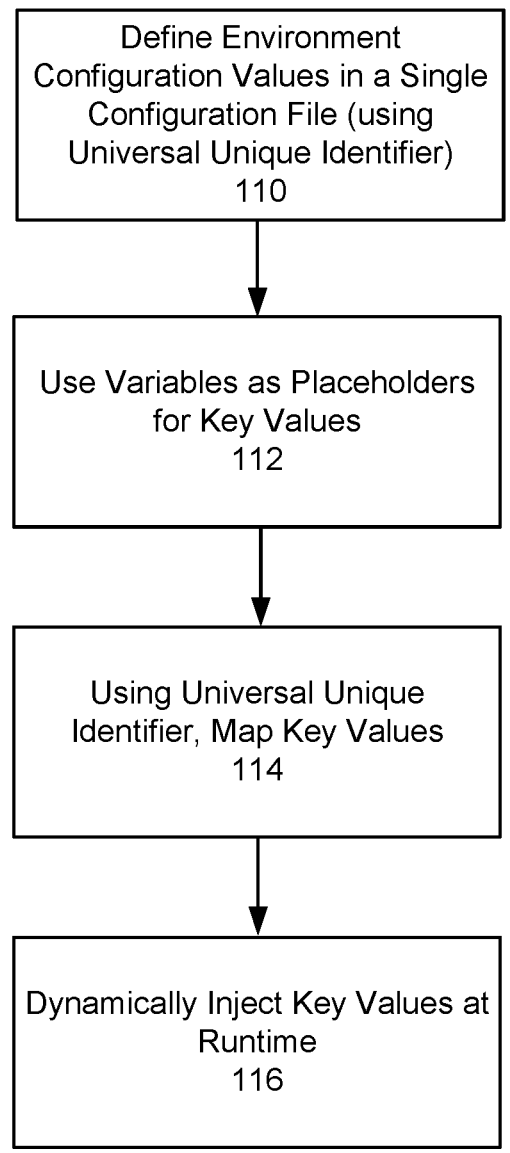
FIG. 1 is an exemplary process flow, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

An embodiment of the present invention is directed to addressing configuration management challenges, enhancing software quality and improving operation performance. An embodiment of the present invention is directed to implementing a unique identifier associated with metadata for a specific environment. Instead of having to manage multiple configuration files for multiple environments, servers and targets, an embodiment of the present invention implements a unique identifier that is linked to metadata (e.g., hostname, etc.) where the unique identifier may be dynamically injected at runtime in a specific environment. This simplifies configuration management and significantly reduces or eliminates human errors relating to mismatched configuration data as well as other inaccuracies and redundancies.

Current configuration management approach involves using multiple file names for multiple environments. Environments may include development environment (DEV); system integration testing environment (SIT); performance testing environment (PTE); user acceptance testing environment (UAT); production environment (PROD); Quality Assurance (QA) and deal processing (e.g., project name). Other environments may be implemented.

When using a template, multiple containers are used to map an environment custom filter to a specific environment. Current configuration management approach may involve non-production values that are used in production but not managed correctly. For example, an UAT container and generator may be used on a production server when a custom filter property was mistakenly identified as a result of human error. Other errors may include using incorrect values which cause service failure and other critical failures. As recognized by an embodiment of the present invention, current configuration management approaches requires heavy maintenance and operation efforts. For example, an operation autosys job start script may have a hard coded environment value "pte1" in order to load corresponding configuration file built inside software. AutoSys represents an automated job control system for scheduling, monitoring, and reporting. Other automated job control systems may be implemented in accordance with an embodiment of the present invention.

FIG. 1 is an exemplary process flow, according to an embodiment of the present invention. At step 110, environment configuration values may be defined in a single configuration file. This may involve using a universal unique identifier mapping, such as hostname, hard drive ID, IP address, etc. At step 112, variables may be used as placeholders for key values rather than actual values. Variables may be used, for example, in a UNIX host start script. In this example, variables may be defined and used as placeholders. At step 114, key values may be mapped using the universal unique identifier. At step 116, key values may be dynamically injected at runtime by mapping to the universal unique identifier. While the process of FIG. 1 illustrates certain steps performed in a particular order, it should be understood that the embodiments of the present invention may be practiced by adding one or more steps to the processes, omitting steps within the processes and/or altering the order in which one or more steps are performed.

FIG. 2 is an exemplary interactive user interface, according to an embodiment of the present invention. With an embodiment of the present invention, unique environment values in single file may be associated with a universal unique environment identifier, e.g., hostname in this case. As shown in FIG. 2, 210 represents a unique identifier in a configuration file. Configuration values may be linked to the hostname, as shown by 212 and 214.

FIG. 3 is an exemplary interactive user interface, according to an embodiment of the present invention. An embodiment of the present invention uses a single source file for multiple environments. As shown by 310, the hostname id is retrieved at runtime. For example, CurHostname='hostname' indicates that the hostname is retrieved at runtime using the 'hostname' command. As shown by 312, a configuration file is read at run time to retrieve hostname mapping values. As shown in 312, CC20AppServers.txt represents the configuration file.

FIG. 4 is an exemplary interactive user interface, according to an embodiment of the present invention. As shown by 410, a hostname is used as an identifier to find values in the configuration file. As shown by 412, environment values may be retrieved at runtime, e.g., $9 or the $9^{th}$ column in the property file.

FIG. 5 is an exemplary interactive user interface, according to an embodiment of the present invention. As shown by 510, configuration values may be injected at runtime.

Figure 6:
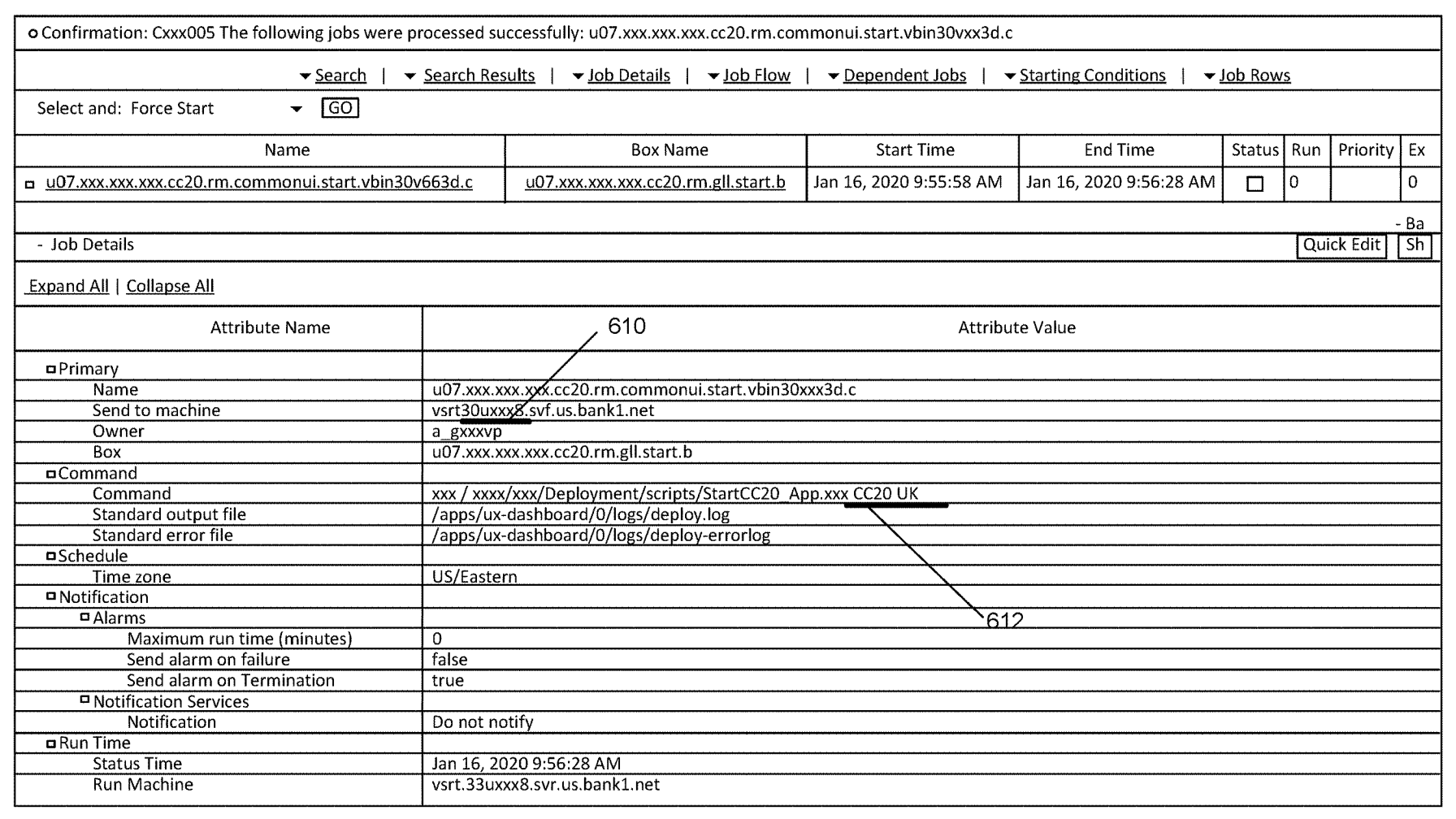

FIG. 6 is an exemplary interactive user interface, according to an embodiment of the present invention. An embodiment of the present invention may use the same command for multiple environments in an autosys job (or other workload automation job or code). This may effectively eliminate environment specific values that would need to be managed. As shown in FIG. 6, 610 represents a hostname defined in autosys job. As shown by 612, a query string used at a command line may be used in multiple environments.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, PHP, C#, Go, Swift, Rust, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a configuration management tool that uses runtime injection to dynamically replace hard coded values at runtime, the system comprising:
   a memory component that stores configuration files; and
   a computer processor, coupled to the memory component, and further programmed to perform:
   defining environment configuration values of a plurality of environments in a single configuration file using a universal unique identifier, such that a same single configuration file is utilized for the plurality of environments;
   applying one or more placeholder variables for one or more corresponding key values in the single configuration file;
   using the universal unique identifier, mapping the one or more corresponding key values in the single configuration file; and
   at the runtime,
      dynamically retrieving the universal unique identifier from the single configuration file stored in the memory,
      dynamically retrieving mapping values for the universal unique identifier,
      dynamically retrieving the one or more key values corresponding to the universal unique identifier based on the dynamically retrieved mapping values, and
      replacing the one or more placeholder variables with the dynamically retrieved one or more corresponding key values,
   wherein the universal unique identifier corresponds to a specific environment among the plurality of environments that utilize the same single configuration file.

2. The system of claim 1, wherein the universal unique identifier is associated with metadata for the specific environment.

3. The system of claim 2, wherein the metadata comprises a hostname.

4. The system of claim 2, wherein the specific environment comprises at least one of: development environment (DEV), system integration testing environment (SIT), performance testing environment (PTE), user acceptance testing environment (UAT), production environment (PROD) and Quality Assurance (QA).

5. The system of claim 1, wherein the single configuration file applies to multiple environments.

6. The system of claim 1, wherein a same command relating to a workload automation job is used for multiple environments thereby eliminating management of environment specific values.

7. The system of claim 1, wherein a query string used at a command line interface is applicable in multiple environments thereby eliminating management of environment specific values.

8. The system of claim 1, wherein the universal unique identifier is an identifier of a hard drive.

9. The system of claim 1, wherein the universal unique identifier is an IP address.

10. The system of claim 1, wherein the one or more placeholder variables are used in a Unix host start script.

11. A method that implements a configuration management tool that uses runtime injection to dynamically replace hard coded values at run time, the method comprising:
    defining environment configuration values of a plurality of environments in a single configuration file using a universal unique identifier, such that a same single configuration file is utilized for the plurality of environments;
    applying one or more placeholder variables for one or more corresponding key values in the single configuration file;
    using the universal unique identifier, mapping the one or more corresponding key values in the single configuration file; and
    at the runtime,
        dynamically retrieving the universal unique identifier from the single configuration file stored in the memory,
        dynamically retrieving mapping values for the universal unique identifier,
        dynamically retrieving the one or more key values corresponding to the universal unique identifier based on the dynamically retrieved mapping values, and
        replacing the one or more placeholder variables with the dynamically retrieved one or more corresponding key values,
    wherein the universal unique identifier corresponds to a specific environment among the plurality of environments that utilize the same single configuration file.

12. The method of claim 11, wherein the universal unique identifier is associated with metadata for the specific environment.

13. The method of claim 12, wherein the metadata comprises a hostname.

14. The method of claim 12, wherein the specific environment comprises at least one of: development environment (DEV), system integration testing environment (SIT), performance testing environment (PTE), user acceptance testing environment (UAT), production environment (PROD) and Quality Assurance (QA).

15. The method of claim 11, wherein the single configuration file applies to multiple environments.

16. The method of claim 11, wherein a same command relating to a workload automation job is used for multiple environments thereby eliminating management of environment specific values.

17. The method of claim 11, wherein a query string used at a command line interface is applicable in multiple environments thereby eliminating management of environment specific values.

* * * * *